UNITED STATES PATENT OFFICE 2,845,435
Patented July 29, 1958

2,845,435

PYRRYL SILICON COMPOUNDS AND THEIR PREPARATION

Kurt C. Frisch, Abington, Pa., and Roland M. Kary, Metuchen, N. J., assignors to E. F. Houghton and Company, Philadelphia, Pa., a corporation of Pennsylvania, and American Smelting and Refining Company, New York, N. Y., a corporation of New Jersey No Drawing. Application October 11, 1955
Serial No. 539,940

9 Claims. (Cl. 260—313)

This invention relates to a new and useful class of compounds and their preparation; said compounds being pyrrylsilicon compounds in which at least one pyrryl group is attached to a silicon atom. More particularly it relates to pyrrylsilanes and their preparation. The present compounds exhibit water repellent properties and the pyrrylchlorosilanes may be hydrolyzed and polymerized to form the corresponding pyrrylsiloxanes.

The invention includes compounds having the following general structure:

$$A_n SiB_{(4-n)}$$

in which Si represents silicon, A represents a pyrryl group, including a substituted pyrryl group, B represents a substituent selected from the group consisting of organic and halogen radicals, and $n$ is an integer from 1 to 3.

More specifically the invention comprehends pyrrylsilanes having the folowing structure:

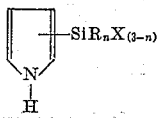

in which Si represents silicon; R is a substituent selected from the group consisting of an aliphatic, aromatic, and alicyclic radicals; X represents a halogen group; and $n$ is an integer from 1 to 3. Preferably, X is chlorine and R is an alkyl or aryl group.

The present novel compounds may be prepared by reacting a pyrrylmagnesium bromide (a pyrryl Grignard reagent) or a lithium pyrrole with a halosilane in an inert medium under dry conditions, and separating and recovering the pyrrylsilane from the inert medium. In the preferred procedure the reagents are heated in an inert medium such as ethyl ether under reflux conditions and temperatures. Although any halosilane may be used in conducting the reaction, chlorosilanes are preferred. In general an aliphatic, aromatic or alicyclic halosilane, and alkyl or aryl halosilanes in particular, are also preferred.

The reaction of a pyrrylmagnesium bromide with a halosilane may be illustrated by the following equation showing the reaction of pyrrylmagnesium bromide and trimethylchlorosilane:

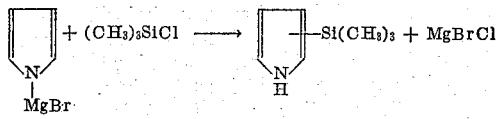

The reaction of a lithium pyrrole with a halosilane may be likewise illustrated by the following equation showing the reaction of lithium pyrrole with trimethylchlorosilane:

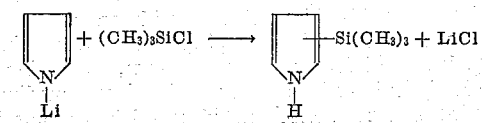

The corresponding mono-, di- and tri-halopyrrylsilanes may be prepared with an appropriate di-, tri- or tetrahalosilane reactant. Thus, for example, pyrryldimethylchlorosilane and pyrrylmethyldichlorosilane may be prepared using dimethyldichlorosilane and methyltrichlorosilane respectively. Likewise, also, di- and tri-pyrrylsilanes may be prepared by using appropriate molar ratios of the reactants.

Pyrrylhalosilanes may be prepared by a more direct method in which a halopyrrole, preferably a chloropyrrole, is reacted with elemental silicon, preferably in a finely divided state, in the presence of an appropriate catalyst, such as a metal catalyst—for example copper or silver powder, at temperatures of about 300–500° C. and recovering a pyrrylhalosilane from the products of reaction. With this method a mixture of pyrrylsilanes, including for example pyrryltrichlorosilane, dipyrryldichlorosilane and tripyrrylchlorosilane may be obtained. It will be understood that in the present compounds and in the above reactions the pyrryl group may be attached to a silicon atom at either the nitrogen or at the 2-C atom, although attachment at the latter position appears to be favored in the reactions.

Pyrrylsiloxanes may be prepared from the pyrrylhalosilanes of the invention, preferably by hydrolyzing and polymerizing a pyrrylchlorosilane in the presence of water. Advantageously, the hydrolyzation and polymerization may be conducted directly in water or in a mixture of an organic solvent and water. Thus, for example, an aqueous mixture of the pyrrylchlorosilane may be agitated or heated or both agitated and heated to form the siloxane. Likewise, also, the pyrrylchlorosilane may be dissolved in an inert liquid which is heavier than and immiscible with water, such as carbontetrachloride or a halobenzene such as chlorobenzene. This solution may then be added to a layer of the inert liquid which is contained beneath a layer of the aqueous solution and the mixture stirred, preferably for at least 20 minutes. The polymerized product remains in the inert liquid and may be washed therein until the wash water is free of halogen. Thereafter the product may be recovered from the inert liquid by evaporating the latter therefrom.

The formation of a pyrrylsiloxane is illustrated in the following reaction showing the formation of monomeric pyrrylmethylsiloxane from pyrryldimethylchlorosilane:

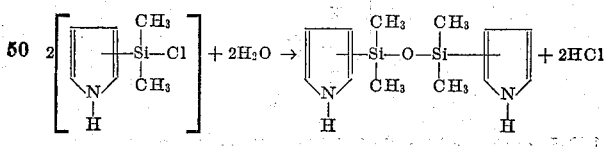

Linear polymers may be prepared by hydrolyzing and polymerizing a pyrryldihalosilane and cross-linked polymers may be prepared from a pyrrylpolyhalosilane containing more than two replaceable halogen substituents attached to the silicon atom. Copolymers may be prepared by hydrolyzing and copolymerizing mixtures of various pyrrylhalosilanes or other halosilanes. Likewise, polymers may be prepared by polymerization through the diene system present in the pyrrole structure of the present silanes and siloxanes. The pyrrylsiloxanes, and particularly the pyrrylmethylsiloxanes, may be used for the modification of conventional silicone oils, elastomers and resins.

The invention is further illustrated in the accompanying examples. It should be understood, however, that the examples are given for purposes of illustration and that the invention in its broader aspects, is not limited thereto.

EXAMPLE I

*2-pyrryltrimethylsilane*

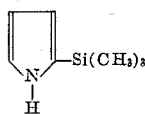

A solution of 132 grams of pyrrole dissolved in 150 cc. of ether was gradually added with cooling to 500 cc. of ether containing 266.6 grams of dissolved ethylmagnesium bromide. After the addition was completed, the solution was allowed to come to room temperature and was then refluxed for two hours. The resulting pyrrylmagnesium bromide solution possessed a dark green color.

A solution of 108.5 grams of trimethylchlorosilane in 150 cc. of ether was slowly added to one-half of the above prepared pyrrylmagnesium bromide solution at a rate such that moderate refluxing was maintained by the heat of the resulting reaction. Thereafter, the solution was refluxed for two hours, and then was filtered and the filter residue was washed with ether. The solvent and other low boiling material was removed from the filtrate by distillation. The residual liquid was fractionally distilled to obtain a product distilling at 149°–151° C. as a colorless liquid. A yield of 72.5 grams of 2-pyrryltrimethylsilane, corresponding to a theoretical yield of 52%, was obtained. Upon analysis, the product was found to contain 10.7% nitrogen and 19.7% silicon as compared to calculated values of 10.1% nitrogen and 20.1% silicon. The refractive index of the liquid product at 24° C. was found to be $n_D^{24}=1.4670$. Its density at 24° C. was found to be $d_4^{24}=0.875$. The molar refraction ($M_R$) was 44.1 as compared to a calculated value of 44.7. The product was subjected to infrared spectroscopic analysis and was found to exhibit peaks characteristic of methylsilyl compounds as well as peaks characteristic of pyrrole. Strong absorption occurred at 2.99μ, indicating the presence of the unsubstituted —N—H group. Upon dissolving the product in acetone and acidifying with hydrochloric acid a bright red solution was formed.

EXAMPLE II

*2-pyrrylmethyldichlorosilane*

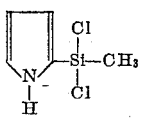

149.5 grams of methyltrichlorosilane in 250 cc. of ether were gradually added to the remaining half of the pyrrylmagnesium bromide prepared for Example I, the addition being controlled to maintain gentle refluxing by the heat of reaction. Thereafter the mixture was refluxed for one hour after which the solution was filtered and the filter residue washed with ether. The solvent and other low boiling material were removed from the filtrate by distillation to obtain a liquid which distilled at 67° C. at 4.8 mm. pressure (82° C. at 5.9 mm. pressure). On redistillation, 2-pyrrylmethyldichlorosilane distilled at 37° C. under 0.25 mm. pressure as a colorless liquid which fumed strongly on exposure to air and formed a deep red solution upon being dissolved in acetone. 75 grams of product, corresponding to a theoretical yield of 42%, was obtained. Upon analysis the product was found to contain 32.5% C, 3.8% H, 7.8% N, 14.7% Si as compared to calculated values of 33.3% C, 3.9% H, 7.8% N, and 15.55% Si respectively.

EXAMPLE III

*2-pyrryltrimethylsilane*

22.4 grams of n-butyllithium in 300 cc. of ether were charged gradually into a three-necked liter flask containing 29.5 grams of pyrrole dissolved in 50 cc. of ether. A mildly exothermic reaction took place during the addition and the solution changed from a clear orange color to a gray-green slurry. After the addition was completed, stirring of the slurry was continued for one hour.

43 grams of trimethylchlorosilane in 100 cc. of ether were gradually added to the above prepared lithium pyrrole slurry. A mild evolution of heat took place during the addition procedure. Upon completion of the addition of the silane, the mixture was refluxed for one hour, the refluxed solution was filtered and the filter residue washed with ether. The solvent was distilled from the filtrate and the residual liquid was fractionally distilled to yield 22 grams of a colorless liquid product distilling at 149–152° C. This yield corresponded to 40% of the theoretical yield of 2-pyrryltrimethylsilane. The liquid product was found to have the following physical characteristics: $n_D^{24}=1.4653$, $d_4^{24}=0.875$, $M_R$ (found) =43.9, $M_R$ (calculated) =44.7. Upon chemical analysis of the product, it was found to contain 10.7% N and 19.7% Si as compared to calculated values of 10.1% N and 20.1% Si. It will be noted that the product is the same as that prepared in Example I. This was further verified by infrared analysis which showed that the product displayed the same peaks and absorption pattern exhibited by the product of Example I.

EXAMPLE IV

*2-pyrrylmethylpolysiloxane*

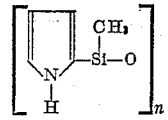

The product of Example II was hydrolyzed and polymerized by adding it to water and stirring the aqueous mixture for about one hour during which time a white polymer was formed. The polymer was separated from the mixture by filtration and was washed until the wash water was free of chloride.

What is claimed is:

1. A 2-pyrryl silicon compound having the structure $$A_nSiB_{(4-n)}$$

in which Si represents silicon, A represents a pyrryl group, and each B is a substituent selected from the group consisting of alkyl, aryl and halogen radicals, and n is an integer from 1 to 3.

2. 2-pyrryltrimethylsilane.

3. 2-pyrrylmethyldichlorosilane.

4. A method of preparing a 2-pyrrylsilane which comprises reacting an anhydrous material from the group consisting of an N-pyrrylmagnesium bromide and an N-lithium pyrrole with an anhydrous halosilane selected from the group consisting of an alkyl halosilane and an aryl halosilane in an anhydrous inert medium under reflux conditions and temperatures, and separating and recovering a 2-pyrrylsilane from said inert medium.

5. A method according to claim 4 in which said halosilane is a chlorosilane.

6. A method of preparing a 2-pyrryl silicon compound which comprises reacting an anhydrous material selected from the group consisting of an N-pyrrylmagnesium bromide and an N-lithium pyrrole with an anhydrous methylpolychlorosilane in an anhydrous inert medium under reflux conditions and temperatures, separating a 2-pyrrylmethylchlorosilane from said inert medium, hydrolyzing and polymerizing said pyrrylchlorosilane in the presence of water, and separating the polymerized product from said water to form therefrom a siloxane.

7. The method of preparing a polymerized 2-pyrryl silicon compound comprising agitating a 2-pyrrylchlorosilane with water thereby hydrolyzing and polymerizing said silane to form a siloxane, and separating the resulting polymerized compound from said water.

8. A method of preparing a polymerized 2-pyrryl silicon compound which comprises dissolving a 2-pyrrylchlorosilane in an inert liquid which is heavier than and immiscible with water, adding the solution to water, agitating the resulting mixture to hydrolize and polymerize said silane and form therefrom a siloxane and separating the resulting polymerized material from said inert liquid.

9. A process according to claim 7 in which said chlorosilane is 2-pyrrylmethyldichlorosilane.

References Cited in the file of this patent
UNITED STATES PATENTS

| | | |
|---|---|---|
| 2,640,818 | Di Giorgio | June 2, 1953 |
| 2,640,833 | Di Giorgio | June 2, 1953 |

OTHER REFERENCES

Karrer: Organic Chemistry, 2nd English ed., 1946, Elsevier Publ. Co. Inc., pp. 743–749.

Noller: Chemistry of Organic Compounds, 1951, W. B. Saunders Co., pp. 576–581.

Rochow: Chemistry of Silicones, 2nd ed., 1951, John Wiley & Sons, Inc., pp. 32–40.